US009692934B2

(12) United States Patent
Shimazaki et al.

(10) Patent No.: US 9,692,934 B2
(45) Date of Patent: Jun. 27, 2017

(54) COMMUNICATING APPARATUS, COMMUNICATION METHOD, AND STORAGE MEDIUM STORING PROGRAM

(71) Applicant: CANON KABUSHIKI KAISHA, Tokyo (JP)

(72) Inventors: Atsushi Shimazaki, Yokohama (JP); Takashi Moriya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/237,924

(22) Filed: Aug. 16, 2016

(65) Prior Publication Data
US 2016/0360065 A1     Dec. 8, 2016

Related U.S. Application Data

(63) Continuation of application No. 14/257,178, filed on Apr. 21, 2014, now Pat. No. 9,448,753.

(30) Foreign Application Priority Data

Apr. 26, 2013  (JP) ................................ 2013-094642

(51) Int. Cl.
*G06F 3/12* (2006.01)
*H04N 1/327* (2006.01)
(Continued)

(52) U.S. Cl.
CPC ....... *H04N 1/32771* (2013.01); *G06F 3/1203* (2013.01); *G06F 3/1226* (2013.01);
(Continued)

(58) Field of Classification Search
USPC ........................................................ 358/1.15
See application file for complete search history.

(56) References Cited

U.S. PATENT DOCUMENTS 5,537,401 A * 7/1996 Tadamura ........... H04L 12/2854
                                                    370/409
7,142,503 B1  11/2006 Grant ............................ 370/217
(Continued)

FOREIGN PATENT DOCUMENTS

JP    2004-104774    4/2004
JP    2008-154270    7/2008
(Continued)

OTHER PUBLICATIONS

Non-Final Office Action dated Sep. 1, 2015—U.S. Appl. No. 14/257,208.
(Continued)

*Primary Examiner* — Jerome Grant, II
(74) *Attorney, Agent, or Firm* — Fitzpatrick, Cella, Harper & Scinto

(57) ABSTRACT

A communicating apparatus receives a request command which requires a response, and determines whether the communication mode of a partner apparatus corresponding to the request command matches a communication mode executed by the self communicating apparatus. If it is determined that the communication mode of the partner apparatus matches the communication mode executed by the self communicating apparatus, the communicating apparatus transmits a response command to the request command. If it is determined that the communication mode of the partner apparatus does not match the communication mode executed by the self communicating apparatus, the communicating apparatus transmits no response command to the request command.

18 Claims, 12 Drawing Sheets

(51) Int. Cl.
*H04W 4/20* (2009.01)
*H04N 1/00* (2006.01)

(52) U.S. Cl.
CPC .......... *G06F 3/1236* (2013.01); *G06F 3/1292* (2013.01); *H04N 1/00307* (2013.01); *H04W 4/206* (2013.01); *H04N 2201/006* (2013.01); *H04N 2201/0055* (2013.01); *H04N 2201/0094* (2013.01)

(56) References Cited

U.S. PATENT DOCUMENTS

| | | | |
|---|---|---|---|
| 8,073,388 B2 | 12/2011 | Grushkevich et al. | 455/41.2 |
| 8,259,332 B2 | 9/2012 | Shimazaki | 358/1.15 |
| 8,467,726 B2 | 6/2013 | Shirakata et al. | 455/41.2 |
| 8,553,252 B2 | 10/2013 | Shimazaki | 358/1.15 |
| 2002/0063622 A1 | 5/2002 | Armstrong et al. | 340/10.31 |
| 2003/0095524 A1* | 5/2003 | Stephens | H04L 29/06 370/338 |
| 2001/0190449 | 9/2004 | Mannal et al. | 370/229 |
| 2004/0190449 A1 | 9/2004 | Mannal et al. | 370/229 |
| 2008/0279560 A1 | 11/2008 | Osawa et al. | 398/130 |
| 2011/0014876 A1 | 1/2011 | Sakata | 455/69 |
| 2012/0044536 A1 | 2/2012 | Hall | 358/1.15 |
| 2012/0092714 A1 | 4/2012 | Suzuki | 358/1.15 |
| 2012/0106475 A1 | 5/2012 | Jung | 370/329 |
| 2012/0218918 A1 | 8/2012 | Takae et al. | 370/255 |
| 2013/0329600 A1 | 12/2013 | Vedula et al. | 370/254 |
| 2013/0331141 A1 | 12/2013 | Montemurro | 455/515 |
| 2014/0002862 A1 | 1/2014 | Shimazaki | 358/1.15 |
| 2014/0031078 A1 | 1/2014 | Nishikawa | 455/552.1 |
| 2014/0068592 A1 | 3/2014 | Chitre et al. | 717/171 |
| 2014/0210693 A1 | 7/2014 | Bhamidipati et al. | 345/2.3 |
| 2014/0217816 A1 | 8/2014 | Okada | 307/10.1 |
| 2014/0320900 A1 | 10/2014 | Moriya | 358/1.15 |
| 2014/0320908 A1 | 10/2014 | Iwauchi et al. | 358/1.15 |
| 2014/0320909 A1 | 10/2014 | Shimazaki | 358/1.15 |
| 2014/0323060 A1 | 10/2014 | Shimazaki | 455/73 |
| 2015/0223046 A1 | 8/2015 | Patil et al. | 76/23 |
| 2015/0351146 A1 | 12/2015 | Lee | 370/329 |
| 2015/0355875 A1* | 12/2015 | Matsushita | G06F 3/1236 358/1.15 |

FOREIGN PATENT DOCUMENTS

| | | |
|---|---|---|
| JP | 2010-109566 | 5/2010 |
| JP | 2011-249960 A | 12/2011 |
| JP | 2012-0167251 | 9/2012 |
| JP | 2012-175614 | 9/2012 |
| JP | 2014-027538 | 2/2014 |

OTHER PUBLICATIONS

Non-Final Office Action dated Apr. 6, 2016—U.S. Appl. No. 14/257,208.
Counterpart office action, Japanese Application No. 2013094642, dated Feb. 10, 2017.
Counterpart office action, Japanese Application No. 2013094643, dated Feb. 17, 2017.
U.S. Appl. No. 14/257,208—Notice of Allowance issued Feb. 24, 2017.

* cited by examiner

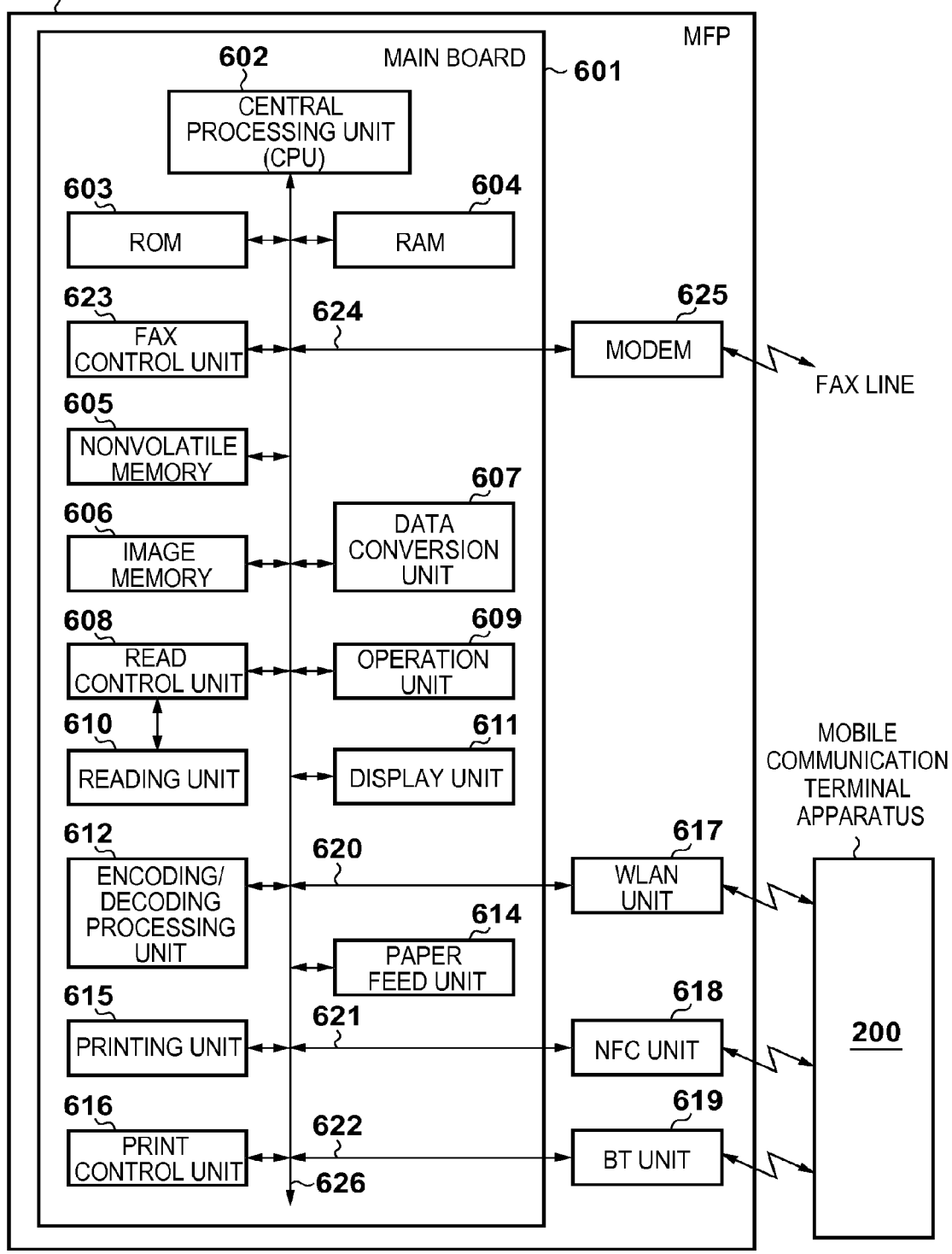

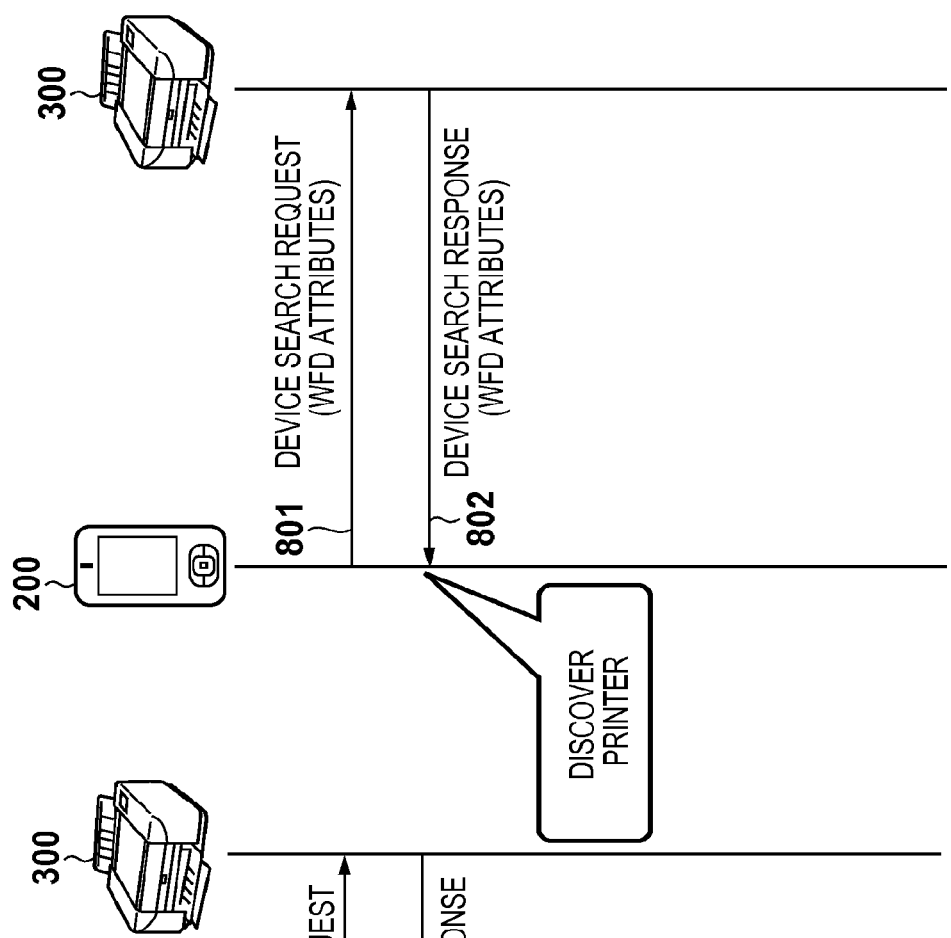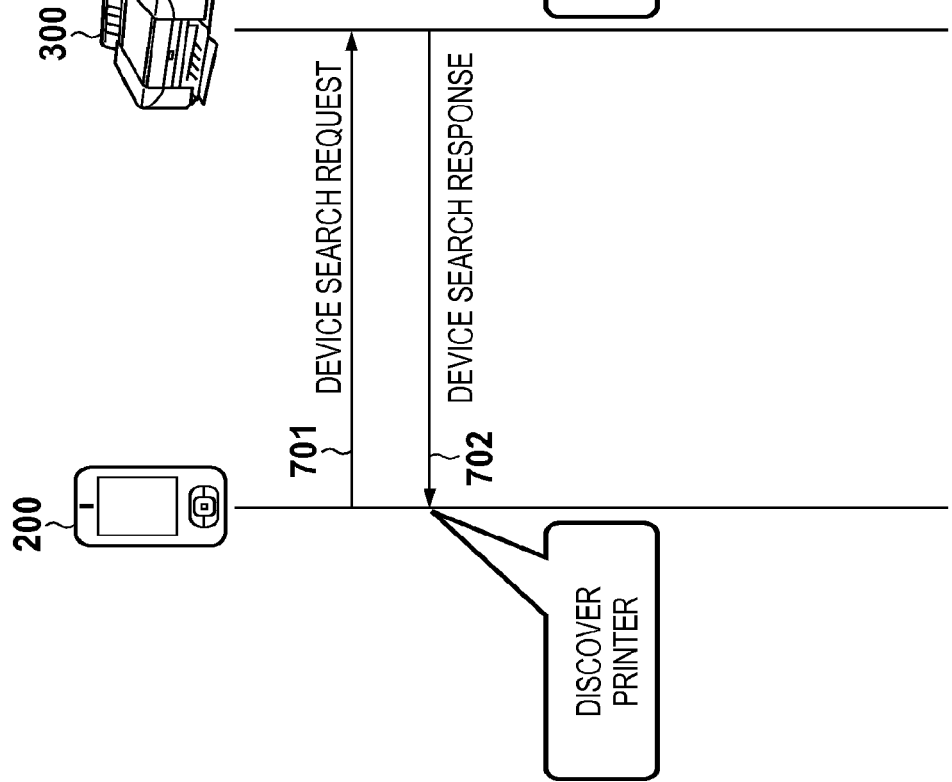

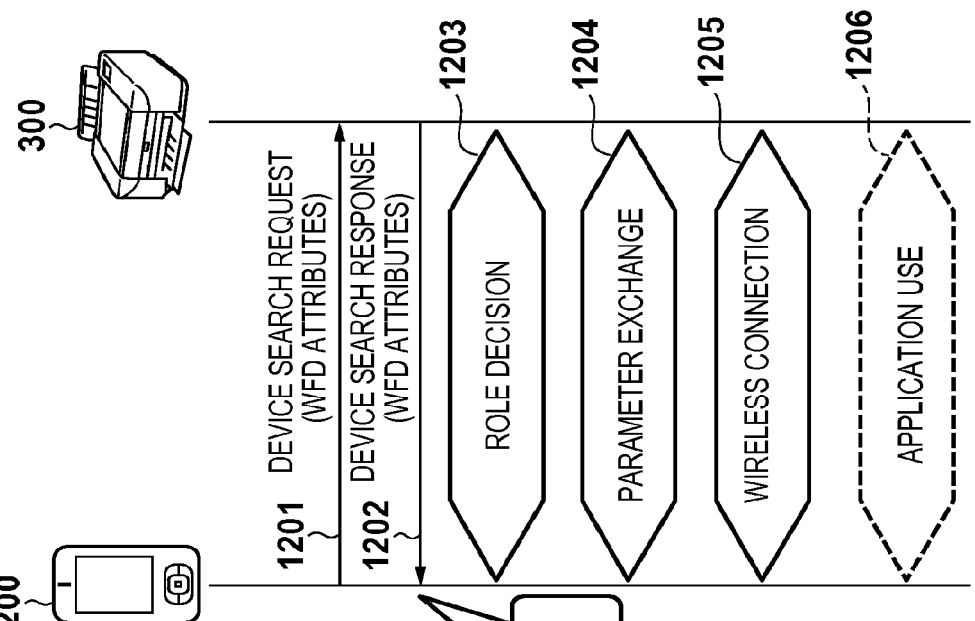
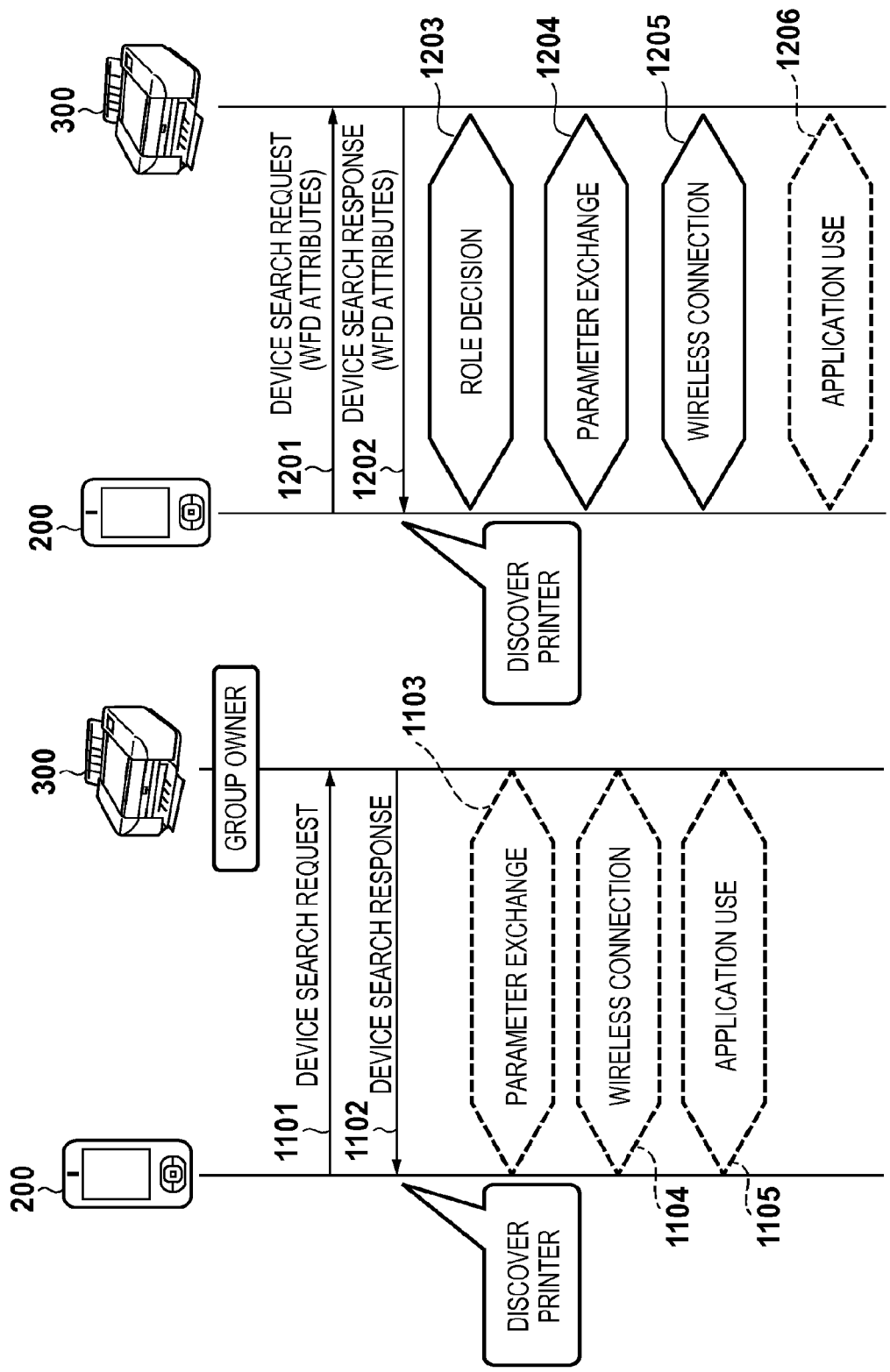

COMMUNICATING APPARATUS, COMMUNICATION METHOD, AND STORAGE MEDIUM STORING PROGRAM

CROSS REFERENCE TO RELATED APPLICATION

This application is a continuation of U.S. application Ser. No. 14/257,178 filed on Apr. 21, 2014, the entire disclosure of which is hereby incorporated by reference herein. This application also claims foreign priority under 35 U.S.C. §119 of Japanese Application No. 2013-094642 filed on Apr. 26, 2013.

BACKGROUND OF THE INVENTION

Field of the Invention

The present invention relates to a communicating apparatus for performing wireless connection, a communication method, and a storage medium storing a program.

Description of the Related Art

In a wireless communication system, in addition to a method (for example, an infrastructure mode) of wirelessly connecting to a partner apparatus via an access point, there is known a peer-to-peer (P2P) wireless connection method in which a self apparatus or a partner apparatus serves as an access point, thereby directly, wirelessly connecting with the partner apparatus.

There is known, for example, Wi-Fi Direct® as a standard for implementing such P2P wireless connection method. A Wi-Fi Direct compatible apparatus can serve as an access point (group owner), thereby allowing direct wireless connection with a partner apparatus. At this time, whether the partner apparatus or the self apparatus serves as an access point is decided according to a sequence called Group Owner Negotiation (Japanese Patent Laid-Open No. 2011-249960).

When a given apparatus on a wireless communication system transmits a probe response command to a received probe request command, an apparatus which has transmitted the probe request command can discover the partner apparatus to be wirelessly connected (device search). After the device search, a sequence of, for example, confirming an IP address and device information indicating an apparatus type is executed, thereby establishing a wireless connection.

When transmitting a probe response command to a received probe request command, it is recommended that the probe response command is transmitted within a range defined by the standard of a wireless connection method by which the self apparatus operates. For example, if a probe request command has been transmitted by an extended Wi-Fi Direct compatible apparatus and the self apparatus serves as a non-extended Wi-Fi Direct compatible apparatus, a probe response command may be transmitted within a range defined by non-extended Wi-Fi Direct. This is because even if information (including various kinds of attributes) added to the probe request command includes uninterpretable information, it is possible to respond to the received probe request command based on only interpretable information. That is, although a corresponding wireless connection sequence or subsequent processing is different, the partner apparatus is discovered. If the subsequent sequence is executed in this state, wireless connection may fail due to a parameter acquisition error or the like, or processing after wireless connection may fail.

SUMMARY OF THE INVENTION

An aspect of the present invention is to eliminate the above-mentioned problems with the conventional technology. The present invention provides a communicating apparatus capable of appropriately processing a request command which requires a response, a communication method, and a program.

The present invention in one aspect provide a communicating apparatus comprising a reception unit configured to receive a request command which requires a response; a determination unit configured to determine based on the request command received by the reception unit whether a communication mode of a partner apparatus matches a communication mode executed by the communicating apparatus; and a response control unit configured to control, if the determination unit determines that the communication mode of the partner apparatus matches the communication mode executed by the communicating apparatus, to transmit a response command to the request command, and if the determination unit determines that the communication mode of the partner apparatus does not match the communication mode executed by the communicating apparatus, not to transmit a response command even though it is possible to respond to the request command.

According to the present invention, it is possible to appropriately process a request command which requires a response.

Further features of the present invention will become apparent from the following description of exemplary embodiments with reference to the attached drawings.

BRIEF DESCRIPTION OF THE DRAWINGS

FIG. 6 is a block diagram showing the arrangement of the MFP;
FIG. 7 is a sequence chart for explaining a device search sequence in a software access point mode;
FIG. 8 is a sequence chart for explaining a device search sequence in a WFD mode;
FIG. 11 is a first sequence chart for explaining a sequence when some operation modes are mixed;
FIG. 12 is a second sequence chart for explaining a sequence when some operation modes are mixed.

DESCRIPTION OF THE EMBODIMENTS

Figure 1:
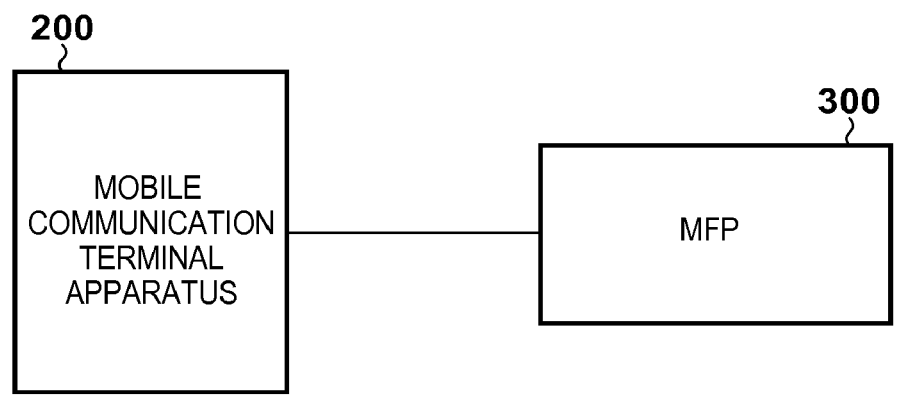
FIG. 1 is a view showing the configuration of a system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same components and a description thereof will be omitted.

FIG. 1 is a view showing the configuration of a wireless communication system including a mobile communication terminal apparatus and a print apparatus (MFP). A mobile communication terminal apparatus 200 is an apparatus including a wireless LAN (WLAN) communication unit and a near field wireless communication unit. Note that near field wireless communication indicates wireless communication whose communication range is a relatively narrow predetermined range (for example, 1 m to several cm or less), which is represented by NFC. The mobile communication terminal apparatus 200 may be a personal information terminal such as a PDA (Personal Digital Assistant), a mobile phone, a digital camera, or the like, and can perform wireless communication (WLAN) with a print apparatus 300. The print apparatus (MFP) 300 need only be wirelessly communicable with the mobile communication terminal apparatus 200, and may additionally have a reading function (scanner), a FAX function, and a telephone function. In this embodiment, an MFP (Multi Function Printer) having a reading function and a printing function will be exemplified. Each of the mobile communication terminal apparatus 200 and the MFP 300 has a near field wireless communication unit using NFC. Even if no power is supplied to the mobile communication terminal apparatus 200, it is possible to perform near field wireless communication by moving the mobile communication terminal apparatus 200 closer to the MFP 300 within a predetermined distance where NFC communication is possible. The MFP 300 can wirelessly communicate with a terminal on a network (network in which communication can be performed using TCP/IP) using a WLAN communication unit. One or both of the mobile communication terminal apparatus 200 and the MFP 300 may perform wireless communication using only the WLAN communication unit without the near field wireless communication unit. Note that the mobile communication terminal apparatus 200 and the MFP 300 can execute processing corresponding to a plurality of print services via a WLAN, as will be described later.

Figure 2:
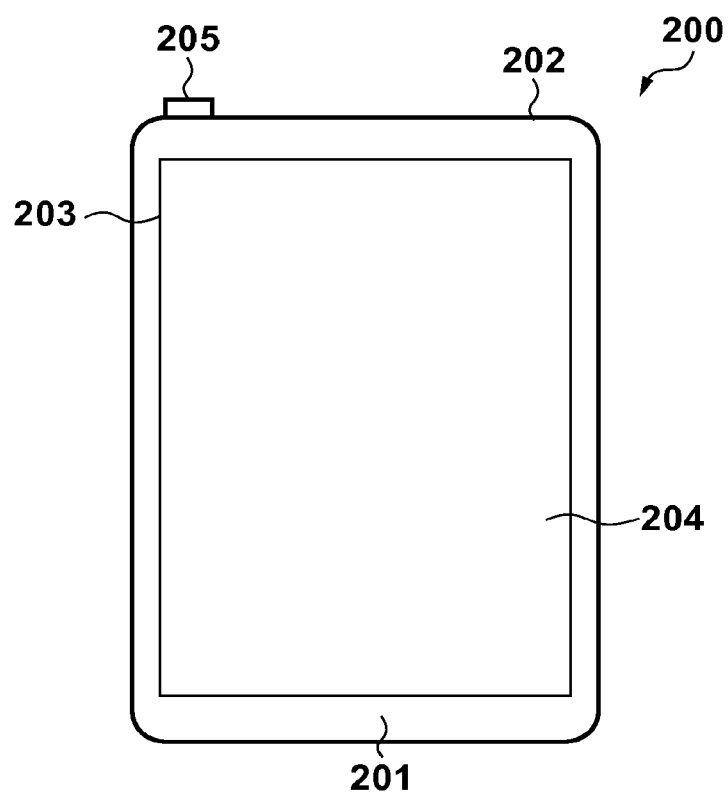
FIG. 2 is a view showing the outer appearance of a mobile communication terminal apparatus.

FIG. 2 is a view showing the outer appearance of the mobile communication terminal apparatus 200. In this embodiment, a smartphone will be exemplified. The smartphone indicates a multi-function mobile phone which incorporates a camera, web browser, email function, and the like in addition to functions of a mobile phone. An NFC unit 201 serving as a near field wireless communication unit is a unit for performing communication using NFC. When the NFC unit 201 is moved closer to a partner NFC unit within a predetermined distance (for example, about 10 cm), they can communicate with each other using NFC.

A WLAN unit 202 is a unit used to perform communication by WLAN. Assume that the WLAN unit 202 can perform data (packet) communication in a WLAN system complying with, for example, IEEE802.11 series. Examples of wireless communication using the WLAN unit 202 include communication based on Wi-Fi Direct (WFD), and communication using a communication mode such as a software AP mode, ad hoc mode, and infrastructure mode. A display unit 203 is a display having an LCD display mechanism. An operation unit 204 includes a touch-panel operation mechanism, and detects an operation by the user. As a representative operation method, the display unit 203 displays button icons and a software keyboard, and when the user touches them, operation events are detected. A power key 205 is a hard key used to turn on/off the power.

Figure 3A:
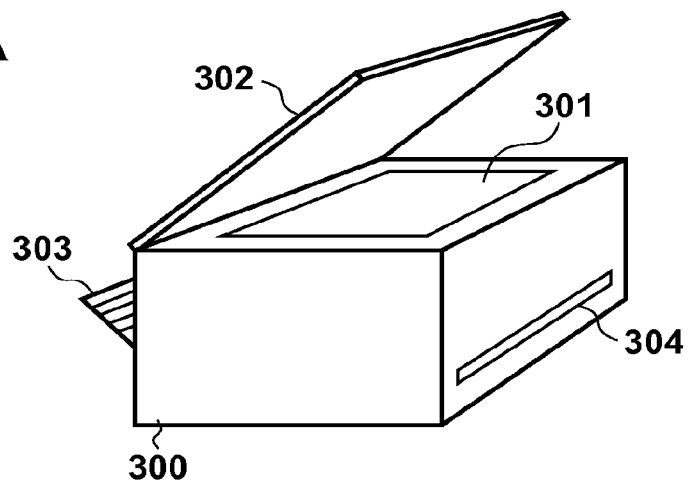
FIGS. 3A and 3B are views showing the outer appearance of an MFP.
Figure 3B:
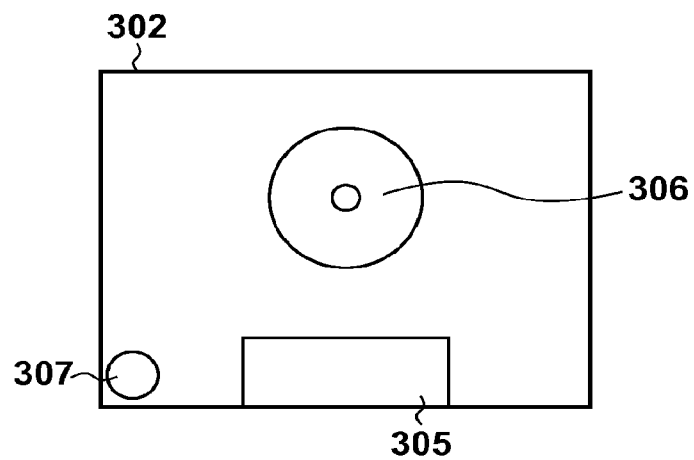

FIGS. 3A and 3B are views showing the outer appearance of the MFP 300. Referring to FIG. 3A, a document table 301 is a glass-like transparent table on which a document to be read by a scanner (reading unit) is placed. A document cover 302 is a cover used to press a document when the scanner reads the document, and prevent external leakage of light from a light source, with which the document is irradiated at the time of reading. A printing paper insert port 303 is an insert port on which paper sheets of various sizes can be set. Paper sheets set on the printing paper insert port 303 are conveyed one by one to a printing unit, and are discharged from a printing paper discharge port 304 after printing is performed by the printing unit. A printing paper is an example of a printing medium.

Referring to FIG. 3B, an operation display unit 305 and an NFC unit 306 are arranged on the upper portion of the document cover 302. The operation display unit 305 will be described in detail with reference to FIG. 4. The NFC unit 306 is a unit used to perform near field wireless communication, and is a place where the mobile communication terminal apparatus 200 is moved closer to the MFP 300. A predetermined distance (about 10 cm) from the NFC unit 306 is an effective distance of NFC communication. A WLAN antenna 307 is an antenna which is used to perform communication by WLAN and is embedded in the MFP.

Figure 4:
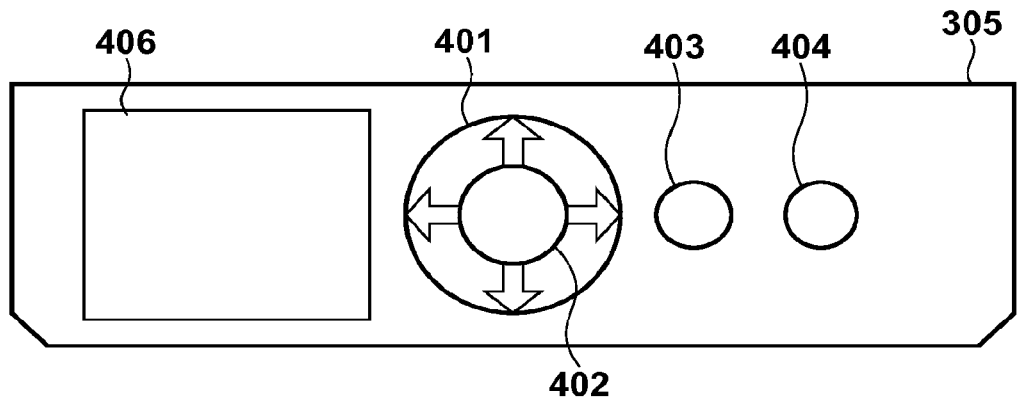
FIG. 4 is a plan view showing an operation display unit.

FIG. 4 is a plan view showing the operation display unit 305. A display unit 406 is a display screen used to display images and a user interface such as an operation menu, and includes, for example, a dot matrix LCD. A 4-way selector 401 is used for operations such as cursor movements on the display unit 406. A set key 402 is a key used to input settings. A function key 403 is used for an operation such as a function setting operation. A start key 404 is used to issue a function execution instruction such as a print start instruction.

Figure 5:
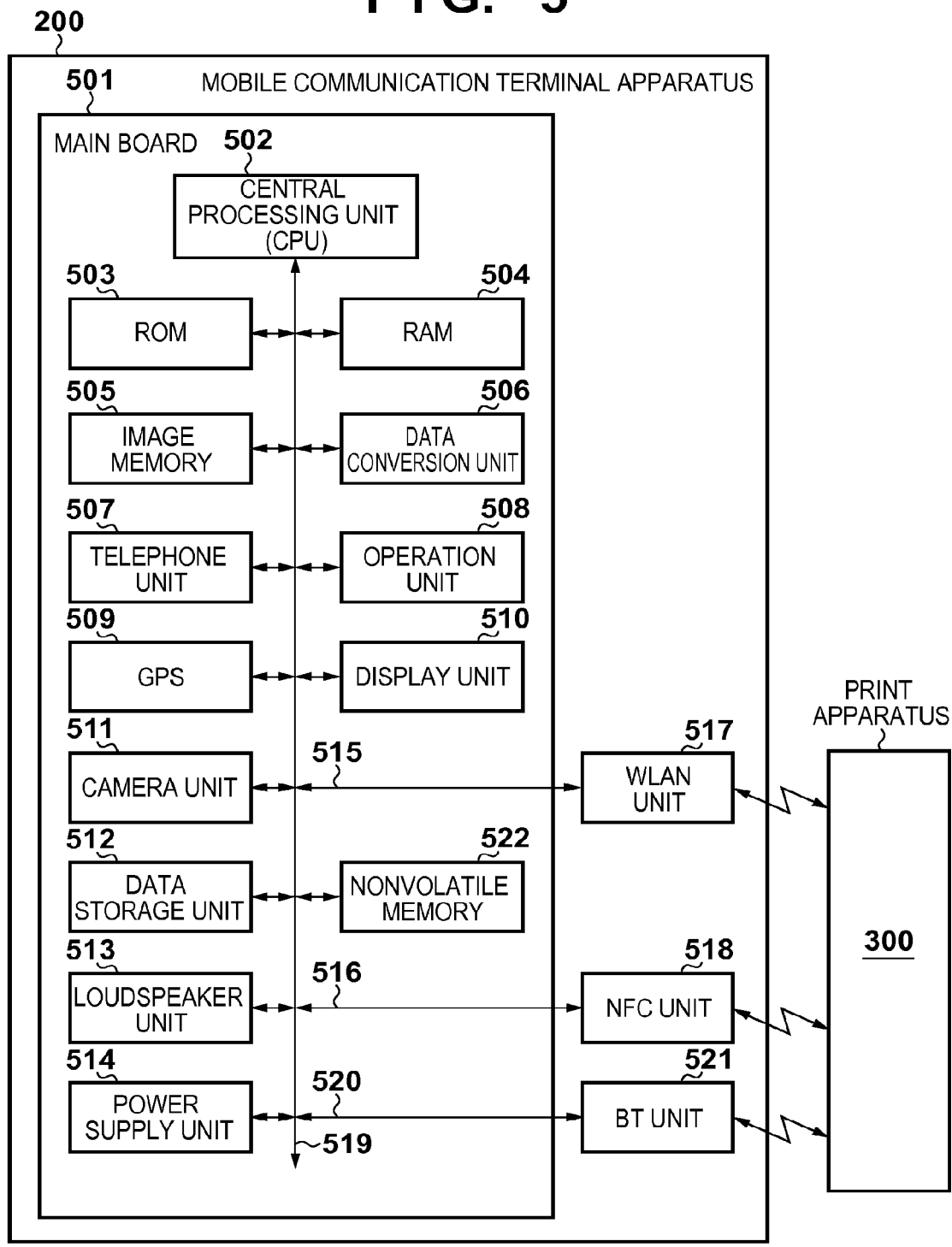
FIG. 5 is a block diagram showing the arrangement of the mobile communication terminal apparatus.

FIG. 5 is a block diagram showing the arrangement of the mobile communication terminal apparatus 200. The mobile communication terminal apparatus 200 includes a main board 501 for executing main control of the apparatus itself, a WLAN unit 517 for performing WLAN communication, an NFC unit 518 for performing NFC communication, and a BT (Bluetooth®) unit 521 for performing Bluetooth® communication.

In the main board 501, a CPU 502 is a system control unit, and controls the overall mobile communication terminal apparatus 200. The following processing by the mobile communication terminal apparatus 200 is executed under the control of the CPU 502. A ROM 503 stores control programs to be executed by the CPU 502, an embedded operating system (OS) program, and the like. In this embodiment, the respective control programs stored in the ROM 503 execute software control such as scheduling and task switching under the management of the embedded OS stored in the ROM 503.

A RAM 504 is implemented by an SRAM (Static RAM) or the like, stores data such as program control variables, also stores data such as setting values registered by the user and management data of the mobile communication terminal apparatus 200, and is allocated with various work buffer areas.

An image memory 505 is implemented by a memory such as a DRAM (Dynamic RAM), and temporarily stores image data received via a communication unit and those read out from a data storage unit 512 so as to be processed by the CPU 502. Note that the communication unit is a general term for communication functions including the WLAN unit 517, NFC unit 518, and BT unit 521.

A nonvolatile memory 522 is implemented by a memory such as a flash memory, and stores data to be saved even after power-off. Note that the memory structure is not limited to this. For example, the image memory 505 and the RAM 504 may share a memory, or data may be backed up in the data storage unit 512. In this embodiment, a DRAM is used as the image memory 505. However, the present invention is not limited to this since another storage medium such as a hard disk or a nonvolatile memory may be used.

A data conversion unit 506 executes analysis of data of various formats, and data conversion such as color conversion and image conversion. A telephone unit 507 controls a telephone line, and implements telephone communication by processing audio data input/output via a loudspeaker unit 513. An operation unit 508 controls signals of the operation unit 204 (FIG. 2). A GPS (Global Positioning System) 509 acquires position information such as the current latitude and longitude of the mobile communication terminal apparatus 200. A display unit 510 electronically controls the display contents of the display unit 203 (FIG. 2), allows various input operations, and can display operation states, status conditions, and the like of the MFP 300.

A camera unit 511 has a function of electronically recording and encoding an image input via a lens. An image captured by the camera unit 511 is saved in the data storage unit 512. The loudspeaker unit 513 realizes a function of inputting or outputting a speech for a telephone function, and also an alarm notification function and the like. A power supply unit 514 is implemented by a portable battery, and controls power supply to the apparatus. A power supply state includes a battery dead state in which the battery has no remaining amount, a power-off state in which the power key 205 is not pressed, an active state in which the apparatus is normally active, and a power saving state in which the apparatus is active but is set in a power saving mode.

The mobile communication terminal apparatus 200 incorporates three communication units used to perform wireless communication, and can perform wireless communication by WLAN, NFC, and Bluetooth®. Thus, the mobile communication terminal apparatus 200 performs data communication with another device such as an MFP. Each communication unit converts data into packets, and transmits the packets to the other device. Conversely, each communication unit converts packets coming from another external device into original data, and transmits the data to the CPU 502. The WLAN unit 517, NFC unit 518, and BT unit 521 are connected to the main board 501 via bus cables 515, 516, and 520, respectively. The WLAN unit 517, NFC unit 518, and BT unit 521 are units each used to attain communication complying with its standard.

The respective components (the ROM 503 to the power supply unit 514, WLAN unit 517, NFC unit 518, BT unit 521, and nonvolatile memory 522) of the main board 501 are connected to each other via a system bus 519 managed by the CPU 502.

FIG. 6 is a block diagram showing the arrangement of the MFP 300. The MFP 300 includes a main board 601 for executing main control of the apparatus itself, a WLAN unit 617 for performing WLAN communication, an NFC unit 618 for performing NFC communication, and a BT unit 619 for performing Bluetooth® communication.

In the main board 601, a CPU 602 is a system control unit, and controls the overall MFP 300. The following processing by the MFP 300 is executed under the control of the CPU 602. A ROM 603 stores control programs to be executed by the CPU 602, an embedded operating system (OS) program, and the like. In this embodiment, the respective control programs stored in the ROM 603 perform software control such as scheduling and task switching under the management of the embedded OS stored in the ROM 603. A RAM 604 is implemented by an SRAM (Static RAM) or the like, stores data such as program control variables, also stores data such as setting values registered by the user and management data of the MFP 300, and is allocated with various work buffer areas.

A nonvolatile memory 605 is implemented by a memory such as a flash memory, and stores data to be saved even after power-off. An image memory 606 is implemented by a memory such as a DRAM (Dynamic RAM), and stores image data received via a communication unit, those processed by an encoding/decoding processing unit 612, and those acquired via a memory card controller 516. Also, the memory structure is not limited to this, similarly to the memory structure of the mobile communication terminal apparatus 200. A data conversion unit 607 executes analysis of data of various formats, conversion from image data into print data, and the like. Note that the communication unit is a general term for communication functions including the WLAN unit 617, NFC unit 618, and BT unit 619.

A read control unit 608 controls a reading unit 610 (for example, a CIS image sensor (contact type image sensor)) to optically read an image on a document. Next, an image signal obtained by converting the read image into electrical image data is output. At this time, various kinds of image processing such as binarization processing and halftone processing may be performed for the image signal, thereby outputting the resultant data.

An operation unit 609 and a display unit 611 correspond to the operation display unit 305 shown in FIG. 4. The encoding/decoding processing unit 612 executes encoding/decoding processing and enlargement/reduction processing for image data (JPEG, PNG, or the like) handled by the MFP 300. A paper feed unit 614 holds paper sheets used in printing. A paper sheet can be fed from the paper feed unit 614 under the control of a print control unit 616. Especially, as the paper feed unit 614, a plurality of paper feed units can be prepared so as to hold a plurality of types of paper sheets in one apparatus. Then, the print control unit 616 can control to select a paper feed unit to be used to supply paper sheets.

The print control unit 616 performs various kinds of image processing such as smoothing processing, printing density correction processing, and color correction for image data to be printed, and outputs the resultant data to a printing unit 615. The printing unit 615 can adopt an inkjet printer which prints an image by discharging, from a printhead, ink supplied from an ink tank. The print control unit 616 also serves to periodically read out information of the printing unit 615, and update information in the RAM 604. More specifically, the print control unit 616 updates status information such as the remaining amount of an ink tank and a printhead state.

The MFP 300 also incorporates three communication units used to perform wireless communication, similarly to the mobile communication terminal apparatus 200, and a description of these communication units will be omitted since their functions are the same. The WLAN unit 617, NFC unit 618, and BT unit 619 are connected to the main board 601 via bus cables 620, 621, and 622, respectively.

The respective components (the CPU 602 to the BT unit 619) of the main board 601 are connected to each other via a system bus 626 managed by the CPU 602.

[Peer-to-Peer Wireless Connection (P2P Wireless Connection)]

The mobile communication terminal apparatus 200 and the MFP 300 can establish a peer-to-peer (P2P) wireless connection complying with WFD. WFD is a standard stipulated by Wi-Fi Alliance, and described in "Wi-Fi Peer-to-Peer (P2P) Technical Specification Version 1.1". The mobile communication terminal apparatus 200 and MFP 300 which are WFD compatible apparatuses have a software access point (soft AP) function serving as an access point. This allows the mobile communication terminal apparatus 200 and the MFP 300 to directly, wirelessly connect with each other by WFD without intervention of another access point. Among a plurality of WFD compatible apparatuses, an apparatus to serve as a soft AP is decided according to a sequence called Group Owner Negotiation. An apparatus which is a WFD compatible apparatus and serves as an access point will be particularly referred to as a group owner hereinafter.

When a probe response command (Probe Response frame) is transmitted in response to a probe request command (Probe Request frame) sent by one apparatus on a wireless communication system, the apparatus which has sent the probe request command can discover a partner apparatus to be wirelessly connected (device search (Discovery)). After that, a sequence of, for example, confirming an IP address and device information indicating an apparatus type is executed, thereby establishing a wireless connection. Especially for P2P wireless connection, the probe request command contains information (P2P elements) about P2P wireless connection.

Three types of operation modes are defined for wireless communication of the MFP 300 according to this embodiment. The first type is a mode (soft AP mode) in which, unlike P2P wireless connection, the self apparatus simulates the operation of an access point by software settings and wirelessly connects to a partner apparatus. The second type is a mode (WFD mode) in which the self apparatus is a WFD compatible apparatus and serves as a group owner. The third type is a mode (WFD extended mode) in which the self apparatus is an extended WFD compatible apparatus and serves as a group owner. Extended WFD indicates a mode in which an extended function at a service level is added to WFD. For example, a probe request command complying with extended WFD contains attribute information (information elements and WFD extended attributes) for defining the specific specifications. The information elements are added to the probe request command complying with WFD in the form of arguments. The WFD mode indicates a mode in which the self apparatus serves as a non-extended WFD apparatus. The mode of the MFP 300 may be designated by the user through the operation unit 609 or the like, or may be fixed.

When transmitting a probe response command to a received probe request command, it is recommended that the probe response command is transmitted within a range defined by the standard of a wireless connection method by which the self apparatus operates. For example, if a probe request command has been transmitted by a WFD compatible apparatus (WFD mode) and the self apparatus is an extended WFD compatible apparatus (WFD extended mode), a probe response command may be transmitted within a range defined by extended WFD even though the self apparatus does not operate in the WFD mode. This is because even if information (including various kinds of attributes) added to the probe request command includes uninterpretable information, it is possible to respond to the received probe request command based on only interpretable information. That is, although a corresponding wireless connection sequence or subsequent processing is different, the partner apparatus is discovered. If, however, the subsequent sequence is executed in this state, wireless connection may fail due to a parameter acquisition error or the like, or processing after wireless connection may fail.

[Device Search Sequence in Each Operation Mode]

A device search sequence in each operation mode will now be described. FIG. 7 is a sequence chart for explaining a device search sequence when the MFP 300 operates in the soft AP mode and the mobile communication terminal apparatus 200 operates in the infrastructure mode. In the soft AP mode, the user manually sets an identification ID such as an SSID, a password, and the like. The mobile communication terminal apparatus 200 transmits a device search request command 701 to the MFP 300. The device search request command corresponds to the above-described probe request command. Upon receiving the device search request command 701, the MFP 300 transmits a device search response command 702 to the mobile communication terminal apparatus 200. Upon receiving the device search response command 702, the mobile communication terminal apparatus 200 discovers the partner apparatus to be wirelessly connected.

FIG. 8 is a sequence chart for explaining a device search sequence when the mobile communication terminal apparatus 200 and the MFP 300 operate in the WFD mode. In the WFD mode, the identification ID, password, and the like are automatically set without intervention of the user. The mobile communication terminal apparatus 200 transmits a device search request command 801 to the MFP 300. Upon receiving the device search request command 801, the MFP 300 transmits a device search response command 802 to the mobile communication terminal apparatus 200. Upon receiving the device search response command 802, the mobile communication terminal apparatus 200 discovers the partner apparatus. Note that the device search request command in the WFD mode contains, in the form of arguments, attribute information (information elements and WFD attributes) for defining WFD-specific specifications.

Figure 9:
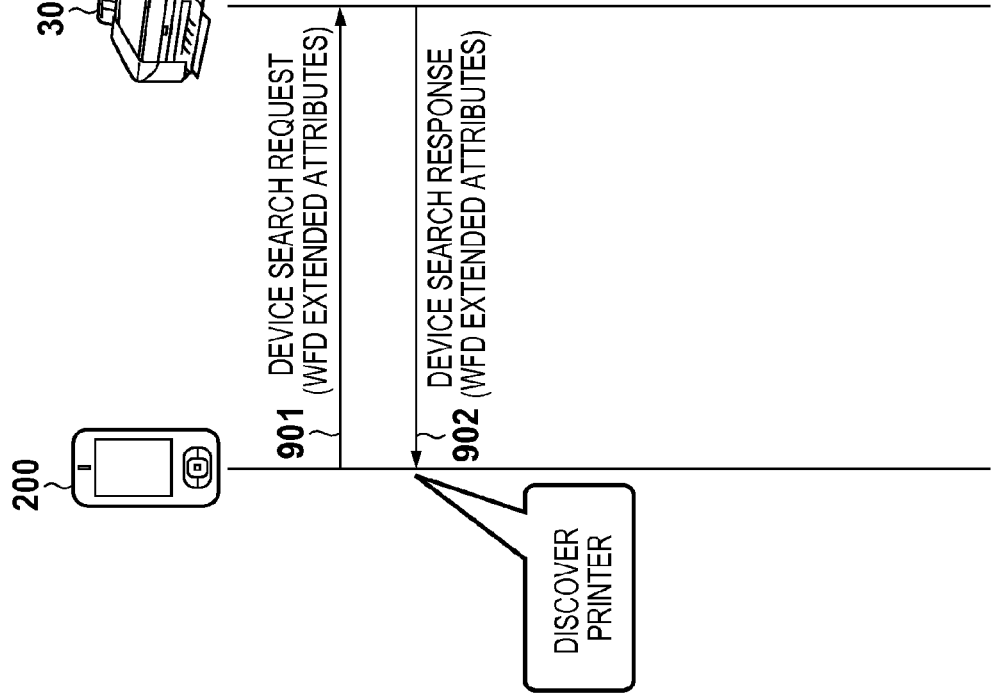
FIG. 9 is a sequence chart for explaining a device search sequence in a WFD extended mode.

FIG. 9 is a sequence chart for explaining a device search sequence when the mobile communication terminal apparatus 200 and the MFP 300 operate in the WFD extended mode. Referring to FIG. 9, the mobile communication terminal apparatus 200 transmits a device search request command 901 to the MFP 300, similarly to FIG. 8. Upon receiving the device search request command 901, the MFP 300 transmits a device search response command 902 to the mobile communication terminal apparatus 200. Upon receiving the device search response command 902, the mobile communication terminal apparatus 200 discovers the partner apparatus.

Figure 10:
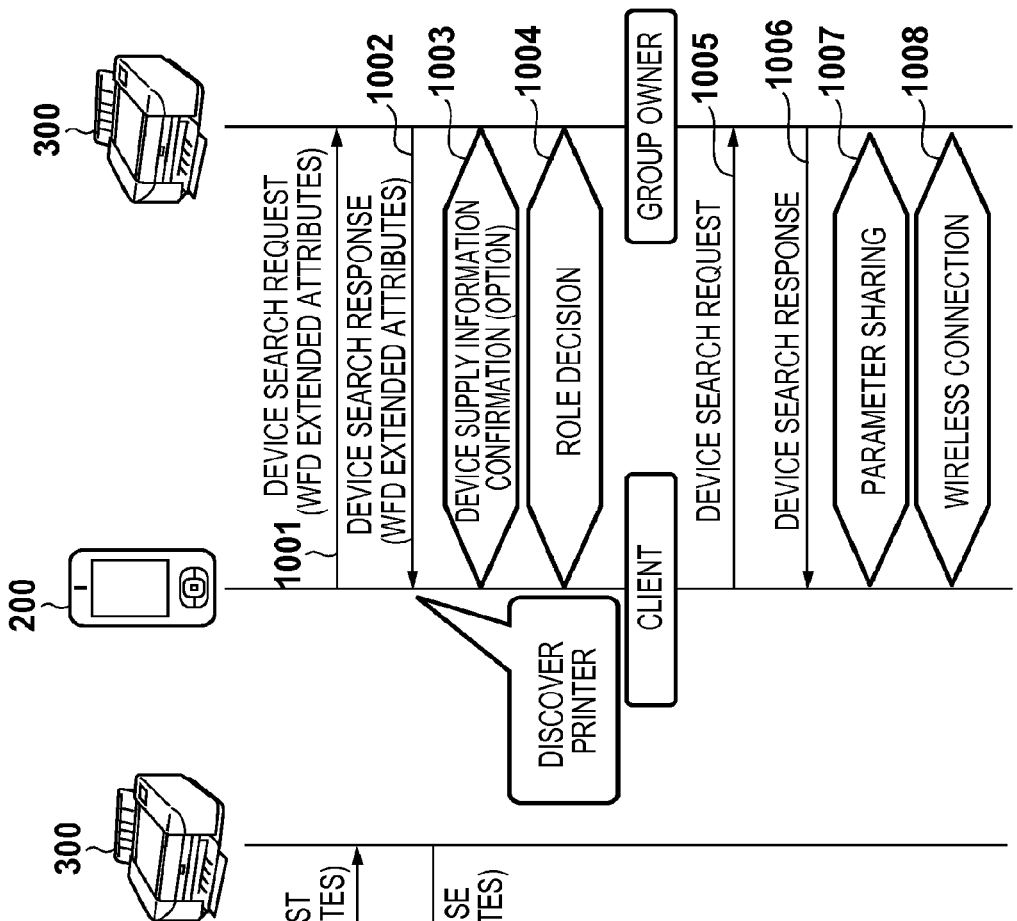
FIG. 10 is a sequence chart for explaining a sequence after FIGS. 8 and 9.

FIG. 10 is a sequence chart for explaining a sequence after the device search sequences shown in FIGS. 8 and 9 when the mobile communication terminal apparatus 200 and the MFP 300 operate in the WFD mode/WFD extended mode. A device search request command 1001 is the same as the device search request commands 801 and 901 in FIGS. 8 and 9, and a device search response command 1002 is the same as the device search response commands 802 and 902 in FIGS. 8 and 9. Note that FIG. 10 shows a case in which the mobile communication terminal apparatus 200 and the MFP 300 operate in the WFD extended mode.

In the WFD mode/WFD extended mode, after transmitting/receiving the device search response command, a device information confirmation phase 1003 is executed. In the device information confirmation phase 1003, each of the apparatuses confirms device information of a partner apparatus. The device information confirmation phase 1003 corresponds to, for example, P2P Provision Discovery. Note that the device information indicates, for example, a device category or type such as a printer or scanner. Note also that execution of the device information confirmation phase 1003 is essential in the WFD extended mode. However, in the WFD mode, the device information confirmation phase 1003 is an optional function, and thus may not be executed.

Next, a role decision phase 1004 is executed. In the role decision phase 1004, one of the mobile communication terminal apparatus 200 and the MFP 300 is determined as a group owner. As the decision method, the Group Owner Negotiation sequence in WFD is determined, and a group owner is decided using parameters 0 to 15 representing the degree of desirability of being a group owner. FIG. 10 shows a case in which the MFP 300 is decided as a group owner and the mobile communication terminal apparatus 200 is decided as a client in the role decision phase 1004. After the role decision phase 1004, the mobile communication terminal apparatus 200 serving as a client transmits a device search request command 1005 to the MFP 300 to reconfirm a wireless channel, SSID, and the like to be used. Note that the device search request command 1005 is different from the device search request commands 801 and 901, and contains no WFD attributes or WFD extended attributes. In response to the device search request command 1005, the MFP 300 transmits a device search response command 1006. The device search response command 1006 transmitted here contains no WFD attributes or WFD extended attributes.

After that, a parameter sharing phase 1007 is executed. In the parameter sharing phase 1007, the apparatuses share various parameters indicating a push button method, PIN code method, and the like. The parameter sharing phase 1007 corresponds to, for example, Wi-Fi Protected Setup. After the execution of the parameter sharing phase 1007, a wireless connection is established at an application level in a wireless connection phase 1008.

[Problem Due to Mixing of Operation Modes]

FIG. 11 is a sequence chart showing a case in which the mobile communication terminal apparatus 200 operates in the infrastructure mode and the MFP 300 operates in the WFD mode or WFD extended mode. In FIG. 11, assume that the MFP 300 already operates as a group owner. In this state, the mobile communication terminal apparatus 200 transmits a device search request command 1101 to the MFP 300. Consequently, the MFP 300 receives the device search request command 1101 whose operation mode is different from that of the self apparatus. As described above, however, it is recommended that a probe response command is transmitted in response to a probe request command within a range defined by the operation mode of the self apparatus. Even if the MFP 300 receives the device search request command 1101 whose operation mode is different, it can discard and ignore a portion outside a range defined by the WFD mode/WFD extended mode, and transmit a device search response command 1102 with respect to a portion within the range defined by the WFD mode/WFD extended mode.

Upon receiving the device search response command, the mobile communication terminal apparatus 200 recognizes that it has discovered the partner apparatus. The mobile communication terminal apparatus 200 then starts to execute a subsequent parameter exchange phase 1103, wireless connection phase 1104, and application use phase 1105. The parameter exchange phase 1103 corresponds to the parameter sharing phase 1007 of FIG. 10. The wireless connection phase 1104 and application use phase 1105 correspond to the wireless connection phase 1008 of FIG. 10.

Since, however, the operation mode of the mobile communication terminal apparatus 200 is different from that of the MFP 300, details of the sequence, for example, parameter exchange and wireless connection of the sequence are different from expected ones. That is, even if the apparatus starts execution of the parameter exchange phase 1103, the phase may fail due to a failure of parameter exchange. Also, even if the apparatus starts execution of the wireless connection phase 1104, the phase may fail due to a failure of wireless connection establishment. Even if a wireless connection can be established, and then apparatus starts execution of the application use phase 1105, an expected result may not be obtained, or the phase may fail since an application expected by the user cannot be used. In such case, for example, the mobile communication terminal apparatus 200 needs to change the operation mode of the self apparatus, and repeat the sequence from the operation of transmitting the device search request command 1101.

FIG. 12 is a sequence chart showing a case in which the mobile communication terminal apparatus 200 operates in the WFD mode and the MFP 300 operates in the WFD extended mode. As shown in FIG. 12, the mobile communication terminal apparatus 200 transmits a device search request command 1201 to the MFP 300. Consequently, the MFP 300 receives the device search request command 1201 whose operation mode is different from that of the self apparatus. As described above, however, even if the MFP 300 receives the device search request command 1201 whose operation mode is different, it can discard and ignore a portion outside a range defined by the WFD extended mode, and transmit a device search response command 1202 with respect to a portion within the range defined by the WFD extended mode.

Upon receiving the device search response command, the mobile communication terminal apparatus 200 recognizes that it has discovered the partner apparatus. The mobile communication terminal apparatus 200 then starts to execute a subsequent role decision phase 1203, parameter exchange phase 1204, wireless connection phase 1205, and application use phase 1206.

However, the operation mode of the mobile communication terminal apparatus 200 is different from that of the MFP 300. Therefore, for example, even if the apparatus starts execution of the application use phase 1206, an application expected by the user cannot be used and thus the phase may fail, or an expected result may not be obtained. For example, since it is impossible to access a desired service or activation of an application is not executed, the user may not be able to use an expected application. In such case, for example, the mobile communication terminal apparatus 200 needs to change the operation mode of the self apparatus, and repeat the sequence from the operation of transmitting the device search request command 1201.

Figure 13:
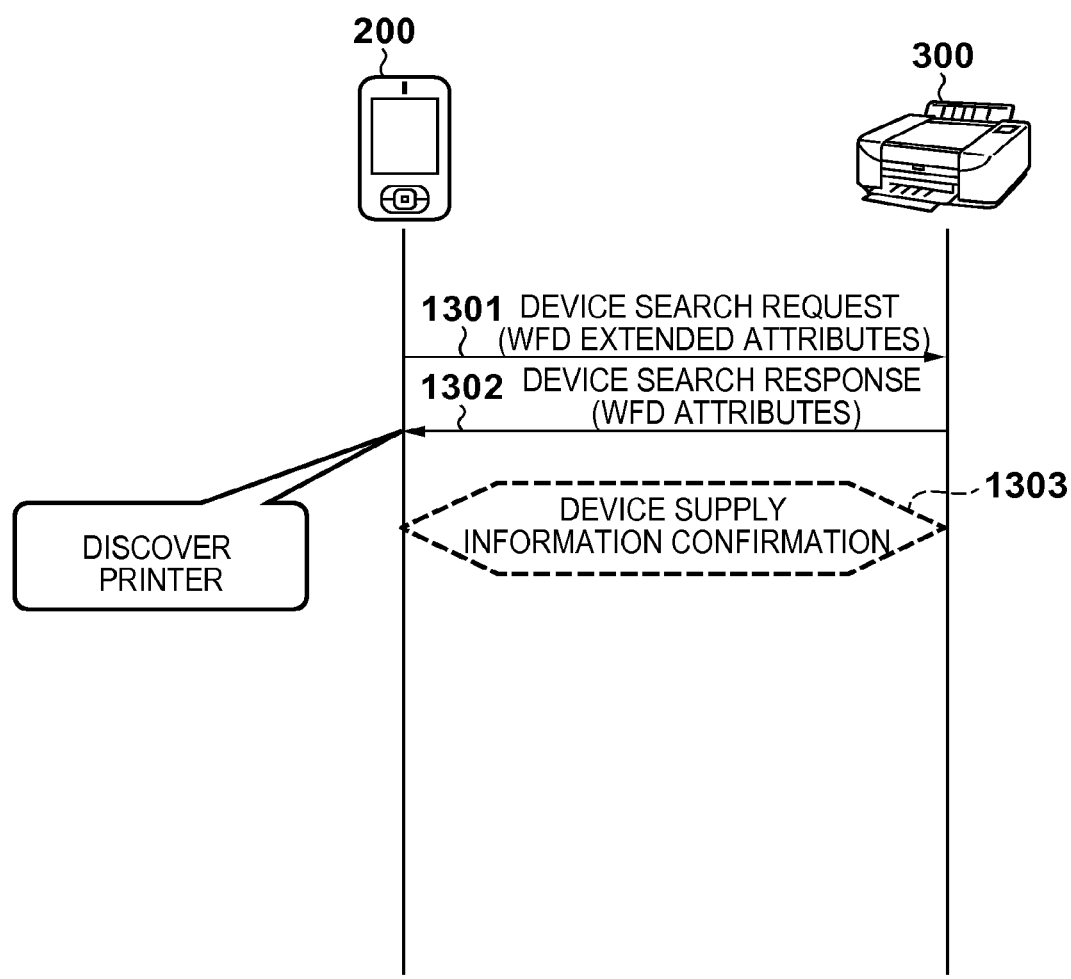
FIG. 13 is a third sequence chart for explaining a sequence when some operation modes are mixed.

FIG. 13 is a sequence chart showing a case in which the mobile communication terminal apparatus 200 operates in the WFD extended mode and the MFP 300 operates in the WFD mode. As shown in FIG. 13, the mobile communication terminal apparatus 200 transmits a device search request command 1301 to the MFP 300. Consequently, the MFP 300 receives the device search request command whose operation mode is different from that of the self apparatus. As described above, however, even if the MFP 300 receives the device search request command 1301 whose mode is different, it can discard and ignore a portion outside a range defined by the WFD mode, and transmit a device search response command 1302 with respect to a portion within the range defined by the WFD mode.

Upon receiving the device search response command, the mobile communication terminal apparatus 200 recognizes that it has discovered the partner apparatus. The mobile communication terminal apparatus 200 then starts to execute a next device supply information confirmation phase 1303.

However, the operation mode of the mobile communication terminal apparatus 200 is different from that of the MFP 300. Therefore, for example, even if the apparatus starts execution of the device supply information confirmation phase 1303, the phase may fail due to a failure of device information confirmation, or an expected result may not be obtained.

Response Control Sequence in Embodiment

In this embodiment, the MFP 300 determines based on the operation mode of the self apparatus whether to transmit a device search response command to a device search request command received from a partner apparatus. If it is determined that a device search response command is to be transmitted, the MFP 300 transmits a device search response command. On the other hand, if it is determined that no device search response command is to be transmitted, the MFP 300 transmits no device search response command. With this arrangement, from the viewpoint of the mobile communication terminal apparatus 200, the operation mode of the received device search response command matches that of the mobile communication terminal apparatus 200. Therefore, the mobile communication terminal apparatus 200 can execute the subsequent connection sequence without any error described with reference to FIGS. 11 to 13.

Figure 14:
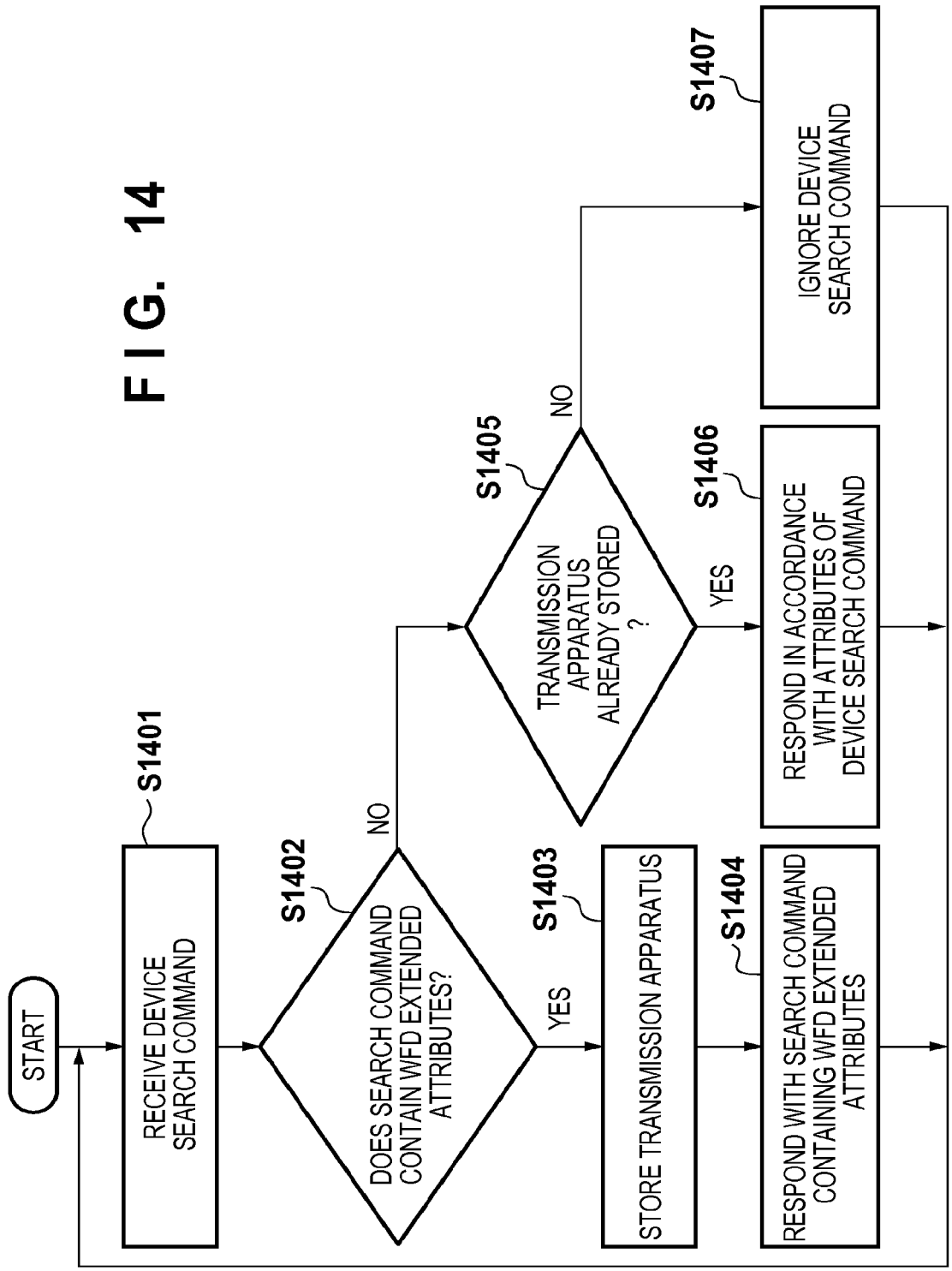
FIG. 14 is a flowchart illustrating a processing procedure when the MFP is in the WFD extended mode.

A case in which the MFP 300 operates in the WFD extended mode will be described first. FIG. 14 is a flowchart illustrating the processing procedure of a response control method when the MFP 300 operates in the WFD extended mode. Respective processes shown in FIG. 14 and those shown in FIGS. 15 and 16 (to be described later) are implemented when, for example, the CPU 602 of the MFP 300 loads control programs stored in the ROM 603 into the RAM 604, and executes the control programs.

In step S1401, the MFP 300 receives a device search request command from the mobile communication terminal apparatus 200. In step S1402, the MFP 300 refers to the received device search request command, and determines whether the command contains extended WFD attribute information. If it is determined that extended WFD attribute information is contained, the process advances to step S1403. In step S1403, the MFP 300 extracts, from the device search request command, the identification ID of the transmission source of the command, that is, the identification ID of the mobile communication terminal apparatus 200, which is attribute information independent of the operation mode, and stores the extracted identification ID in the RAM 604 or the like. Note that the identification ID need only be data for uniquely specifying an apparatus, and may be, for example, a MAC address. In step S1404, the MFP 300 transmits a device search response command containing extended WFD attribute information to the mobile communication terminal apparatus 200. The device search response command returned in step S1404 corresponds to the device search response command 902 of FIG. 9.

If it is determined in step S1402 that no extended WFD attribute information is contained, the process advances to step S1405. In step S1405, the MFP 300 extracts, from the received device search request command, the identification ID of the transmission source of the command, that is, the identification ID of the mobile communication terminal apparatus 200, which is attribute information independent of the operation mode, and determines whether the extracted identification ID matches an identification ID already stored in the RAM 604 or the like.

As described with reference to FIG. 10, in the case of the WFD mode/WFD extended mode, after the role decision phase 1004, the mobile communication terminal apparatus 200 transmits a device search request command without attribute information. At this time, since the MFP 300 and the mobile communication terminal apparatus 200 as the transmission source should be in the same mode, the MFP 300 needs to accept the received device search request command as a command corresponding to the operation mode of the self apparatus even if the device search request command contains no attribute information.

In this embodiment, if it is determined in step S1402 that no extended WFD attribute information is contained but it is determined in step S1405 that the identification ID of the transmission source of the command matches the identification ID already stored in the RAM 604, the received device search request command is determined as the device search request command 1005 of FIG. 10. The MFP 300 then accepts the device search request command as a command corresponding to the operation mode of the self apparatus.

If it is determined in step S1405 that the identification IDs match each other, in step S1406 the MFP 300 transmits a device search response command to the mobile communication terminal apparatus 200. At this time, the MFP 300 transmits the device search response command without attribute information. On the other hand, if it is determined in step S1405 that the identification IDs do not match each other, the MFP 300 determines that the received device search request command is a command corresponding to an operation mode different from that of the self apparatus, and discards the received device search request command. After the processing in step S1404, S1406, or S1407, the MFP 300 stands by for a device search request command again. When the MFP 300 receives a device search request command, it repeats the process from step S1401.

Figure 15:
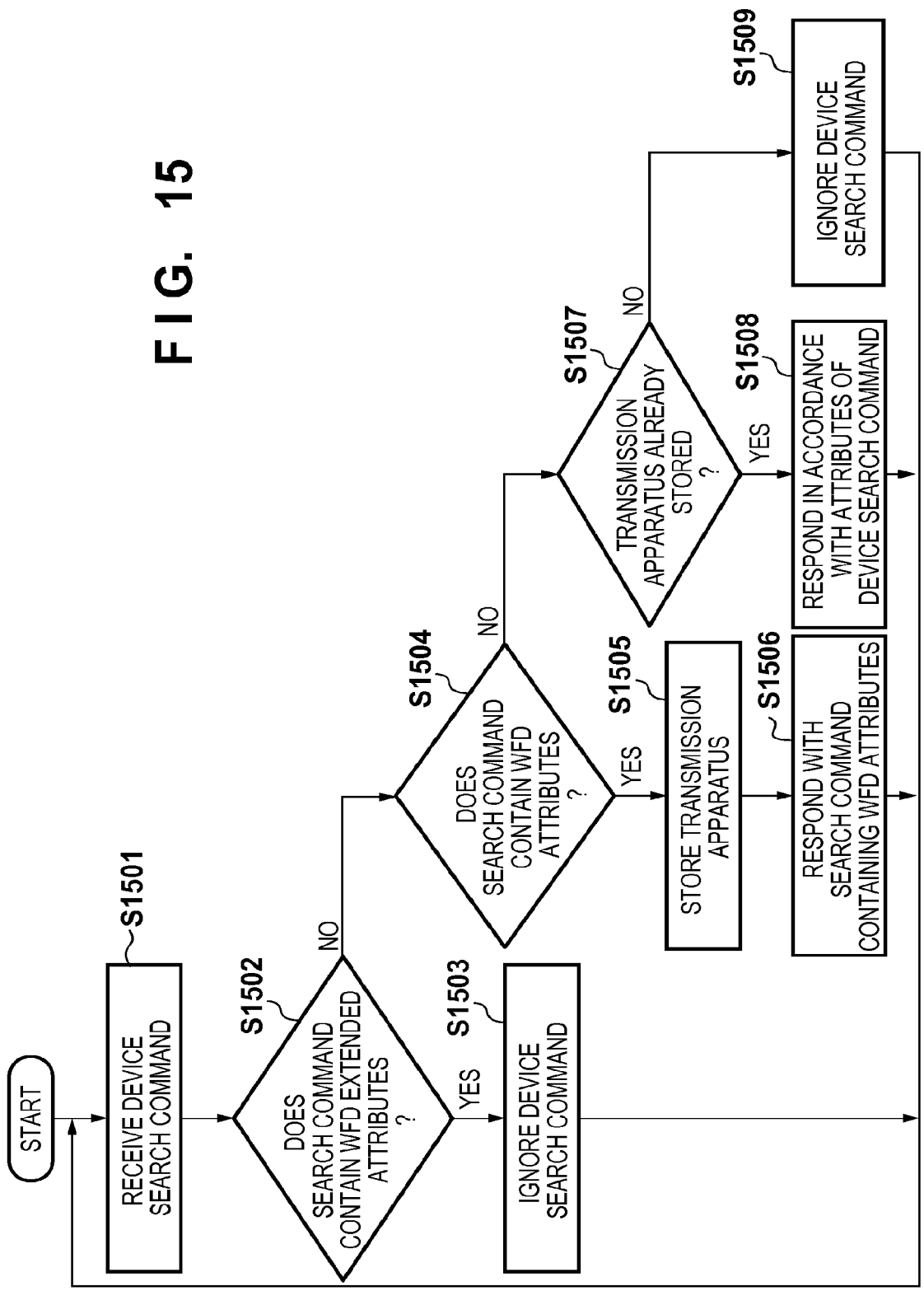
FIG. 15 is a flowchart illustrating a processing procedure when the MFP is in the WFD mode.

FIG. 15 is a flowchart illustrating the processing procedure of a response control method when the MFP 300 operates in the WFD mode. In step S1501, the MFP 300 receives a device search request command from the mobile communication terminal apparatus 200. In step S1502, the MFP 300 refers to the received device search request command, and determines whether the command contains extended WFD attribute information (the presence/absence of extended WFD attribute information). If it is determined that extended WFD attribute information is contained, it means that attributes unnecessary for the mode of the self apparatus are added, and the operation mode corresponding to the received command is different from that of the self apparatus. Therefore, in step S1503, the MFP 300 discards the received device search request command.

If it is determined in step S1502 that no extended WFD attribute information is contained, in step S1504 the MFP 300 refers to the received device search request command, and determines whether the command contains WFD attribute information. If it is determined that WFD attribute information is contained, in step S1505 the MFP 300 extracts, from the device search request command, the identification ID of the transmission source of the command, that is, the identification ID of the mobile communication terminal apparatus 200, which is attribute information independent of the operation mode, and stores the extracted identification ID in the RAM 604 or the like. Note that the identification ID need only be data for uniquely specifying an apparatus, and may be, for example, a MAC address. In step S1506, the MFP 300 transmits a device search response command containing WFD attribute information to the mobile communication terminal apparatus 200. The device search response command transmitted in step S1506 corresponds to the device search response command 802 of FIG. 8.

If it is determined in step S1504 that no WFD attribute information is contained, the process advances to step S1507. In step S1507, the MFP 300 extracts, from the received device search request command, the identification ID of the transmission source of the command, that is, the identification ID of the mobile communication terminal apparatus 200, which is attribute information independent of the operation mode, and determines whether the extracted identification ID matches an identification ID already stored in the RAM 604 or the like.

If it is determined in step S1507 that the identification ID of the transmission source of the command matches the identification ID already stored in the RAM 604, the received command is determined as the device search request command 1005 of FIG. 10. In step S1508, the MFP 300 returns a device search response command to the mobile communication terminal apparatus 200. In this case, the MFP 300 transmits the device search response command without attribute information.

If it is determined in step S1507 that the identification IDs do not match each other, the MFP 300 determines that the received device search request command is a command corresponding to an operation mode different from that of the self apparatus, and discards the received device search request command. After the processing in step S1503, S1506, S1508, or S1509, the MFP 300 stands by for a device search request command again. When the MFP 300 receives a device search request command, it repeats the process from step S1501.

Figure 16:
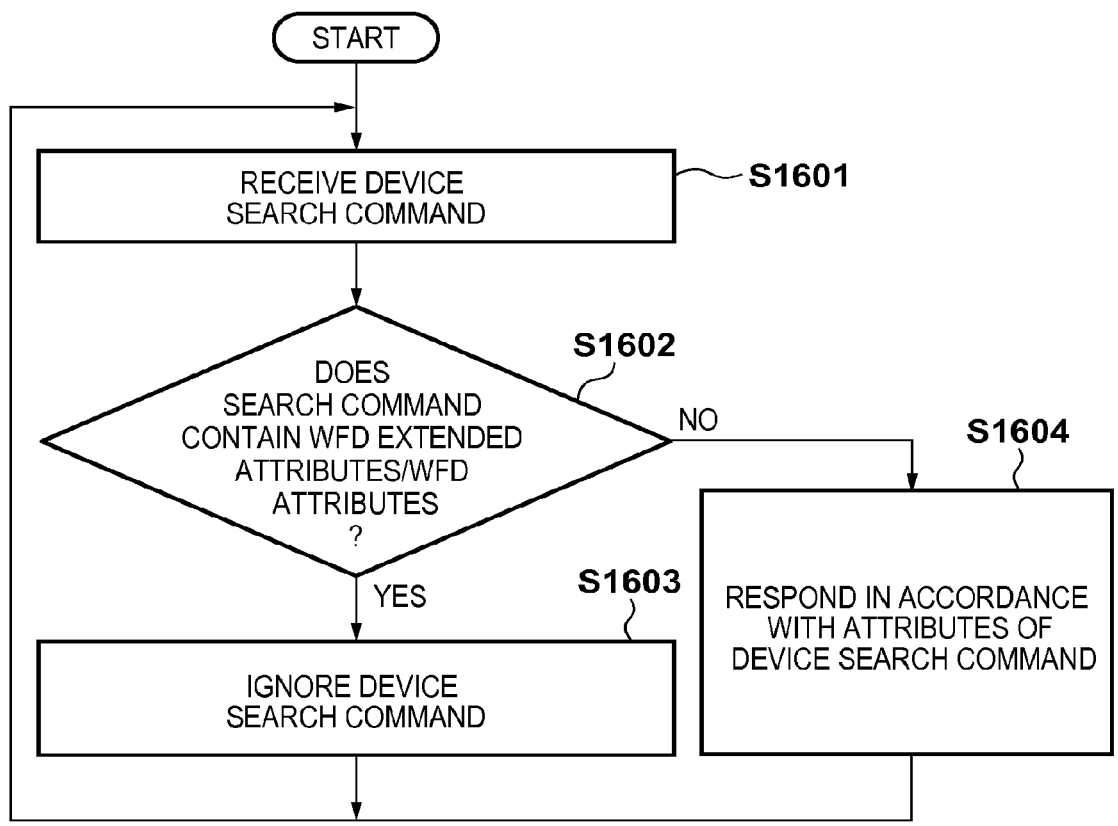
FIG. 16 is a flowchart illustrating a processing procedure when the MFP is in the software access point mode.

FIG. 16 is a flowchart illustrating the processing procedure of a response control method when the MFP 300 operates in the soft AP mode.

In step S1601, the MFP 300 receives a device search request command from the mobile communication terminal apparatus 200. In step S1602, the MFP 300 refers to the received device search request command, and determines whether the command contains WFD attribute information or extended WFD attribute information. If it is determined that one of the pieces of attribute information is contained, it means that an operation mode corresponding to the received command is different from that of the self apparatus. Thus, in step S1603, the MFP 300 discards the received device search request command.

If it is determined in step S1602 that none of the pieces of attribute information are contained, the MFP 300 determines in step S1604 that an operation mode corresponding to the received device search request command is the soft AP mode. The MFP 300 transmits a device search response command to the mobile communication terminal apparatus 200.

[Processing on Mobile Communication Terminal Apparatus Side]

Processing in which the MFP 300 transmits a device search response command to only a device search request command corresponding to an operation mode matching the operation mode of the self apparatus has been described with reference to FIGS. 14 to 16. Next, processing in which when the mobile communication terminal apparatus 200 that has transmitted a device search request command receives a device search response command from a partner apparatus, it can present only apparatuses, whose operation mode matches the operation mode of the self apparatus, as a search result to the user will be explained.

Figure 17:
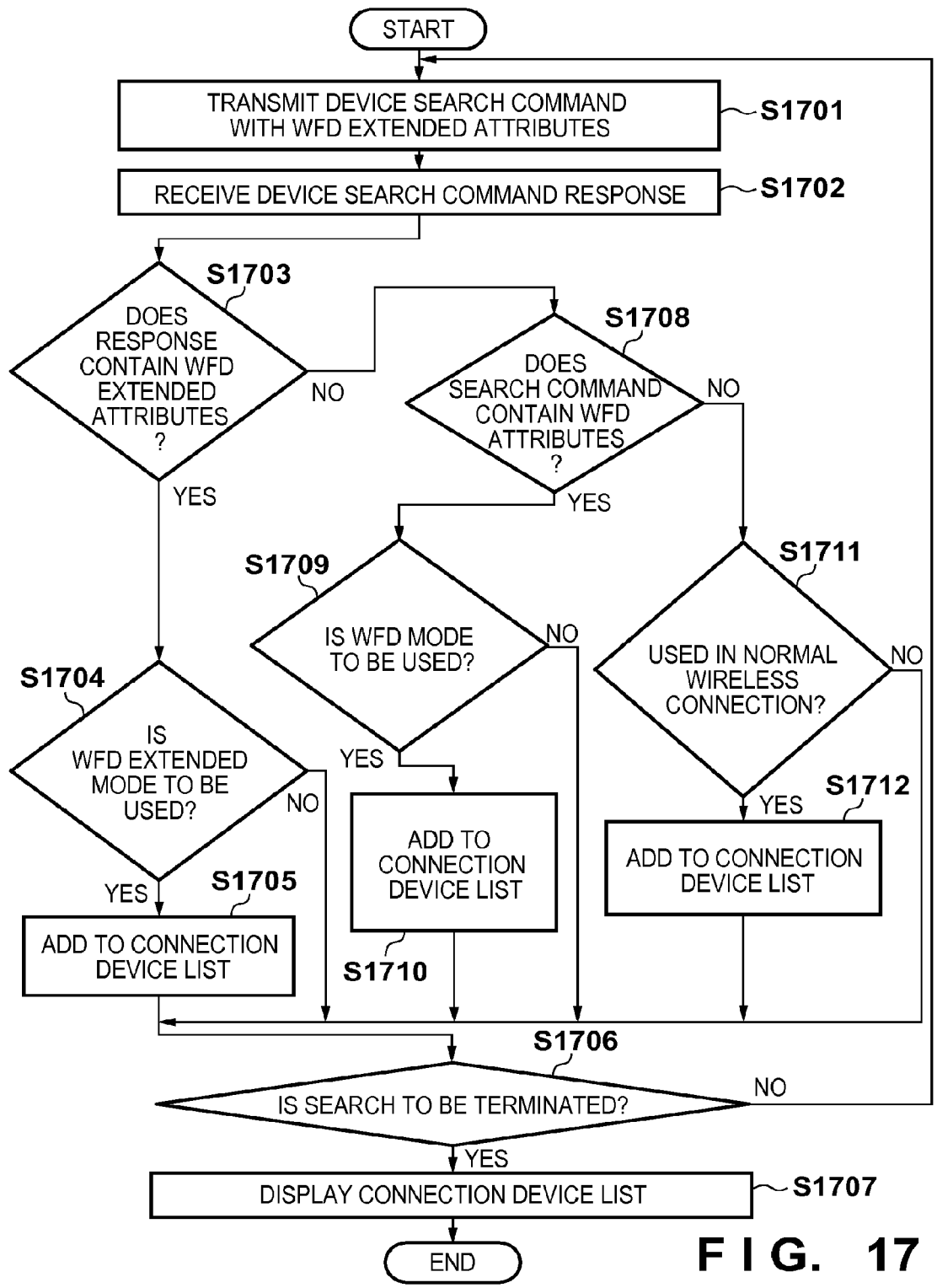
FIG. 17 is a flowchart illustrating the processing procedure of the mobile communication terminal apparatus.

FIG. 17 is a flowchart illustrating the mode control processing procedure of the mobile communication terminal apparatus 200. Each process shown in FIG. 17 is implemented when, for example, the CPU 502 of the mobile communication terminal apparatus 200 loads a control program stored in the ROM 503 into the RAM 504, and executes the control program. In FIG. 17, assume that the mobile communication terminal apparatus 200 operates in the WFD extended mode.

In step S1701, the mobile communication terminal apparatus 200 transmits a device search request command to the MFP 300. In step S1702, the mobile communication terminal apparatus 200 receives a device search response command from a partner apparatus. In step S1703, the mobile communication terminal apparatus 200 refers to the received device search response command, and determines whether the command contains extended WFD attribute information. If it is determined that extended WFD attribute information is contained, the process advances to step S1704. In step S1704, the mobile communication terminal apparatus 200 determines whether the self apparatus operates in the WFD extended mode. If it is determined that the self apparatus operates in the WFD extended mode, in step S1705 the mobile communication terminal apparatus 200 extracts the identification ID of the partner apparatus from the received device search response command, and adds it to a connection destination device list stored in advance in the RAM 504 or the like. On the other hand, if it is determined in step S1704 that the self apparatus does not operate in the WFD extended mode, or after the processing in step S1705 is performed, the process advances to step S1706.

If it is determined in step S1703 that no extended WFD attribute information is contained, the mobile communication terminal apparatus 200 determines in step S1708 whether the device search response command contains WFD attribute information. If it is determined that WFD attribute information is contained, the mobile communication terminal apparatus 200 determines in step S1709 whether the self apparatus operates in the WFD mode. If it is determined that the self apparatus operates in the WFD mode, the apparatus 200 extracts the identification ID of the partner apparatus from the received device search response command, and adds it to the connection destination device list. If it is determined in step S1709 that the self apparatus does not operate in the WFD mode or after the processing in step S1710 is performed, the process advances to step S1706.

If it is determined in step S1708 that no WFD attribute information is contained, the mobile communication terminal apparatus 200 determines in step S1711 whether the self apparatus operates in the infrastructure mode. If it is determined that the self apparatus operates in the infrastructure mode, the mobile communication terminal apparatus 200 extracts the identification ID of the partner apparatus from the received device search response command, and adds it to the connection destination device list. If it is determined in step S1711 that the self apparatus does not operate in the infrastructure mode, the process advances to step S1706.

In step S1706, the mobile communication terminal apparatus 200 determines whether the device search is to be terminated. If, for example, there are a plurality of partner apparatuses to which the device search request command has been transmitted, and it is determined that the processing in FIG. 17 has been performed for all the apparatuses, it may be determined that the device search is to be terminated, thereby advancing to step S1707. If it is determined in step S1706 that the device search is not to be terminated, the process is repeated from step S1701. On the other hand, if it is determined that the device search is to be terminated, the connection destination device list is displayed on the display of the operation unit 508 of the mobile communication terminal apparatus 200. After that, the mobile communication terminal apparatus 200 may accept a selection of a connection destination device on the display of the operation unit 508, and establish a wireless connection to the selected device thereafter.

In this embodiment, the mobile communication terminal apparatus 200 presents only apparatuses, whose operation mode matches that of the self apparatus, as a search result to the user. However, the mobile communication terminal apparatus 200 may change the operation mode of the self apparatus to match the operation mode of a discovered partner apparatus.

In FIG. 17, for example, if it is determined in step S1703 that no extended WFD attribute information is contained, the mobile communication terminal apparatus 200 determines in step S1708 whether WFD attribute information is contained. If it is determined that WFD attribute information is contained, it is determined in step S1709 whether the mobile communication terminal apparatus 200 will operate in the WFD mode. If it is determined that the mobile communication terminal apparatus 200 will operate in the WFD mode, the mobile communication terminal apparatus 200 changes the operation mode of the self apparatus to the WFD mode. The operation mode may be changed by, for example, displaying an operation mode change acceptance screen on the display of the operation unit 508, and accepting a change instruction from the user. This makes it possible to perform wireless connection by changing the operation mode of the mobile communication terminal apparatus 200, even if the operation mode of the mobile communication terminal apparatus 200 is different from that of the partner apparatus. The mode of the mobile communication terminal apparatus 200 may be determined when the device to be connected is determined based on the connection destination device list. In that case, the mobile communication terminal apparatus 200 has stored, for each ID of the device, the device search response command from the device in response to the device search request command from the mobile communication terminal apparatus 200 to create the connection destination device list. And the mobile communication terminal apparatus 200 determines the mode of the mobile communication terminal apparatus 200 based on the device selected by the user.

In above case, an operation mode determined by the device search response command may be stored for each ID of the device instead of the device search response command.

As described above, according to this embodiment, the MFP 300 transmits a device search response command to only a device search request command corresponding to the operation mode of the self apparatus. With this arrangement, since the operation mode of the partner apparatus which has been discovered by receiving the device search response command always matches that of the self apparatus, it is possible to execute the subsequent sequence for establishing a wireless connection without any error.

According to this embodiment, the mobile communication terminal apparatus 200 can present, as a search result to the user, only apparatuses for which an operation mode corresponding to a received device search response command matches that of the self apparatus. If the operation modes are different from each other, the mobile communication terminal apparatus 200 can change the operation mode of the self apparatus to match the operation mode of the partner apparatus. As a result, the subsequent processing can be executed without any error.

Note that although a case in which wireless communication is performed has been exemplified in the above embodiment, the same processing can be performed for communication by a wired network.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

A program may be executed by a single computer or a plurality of computers in cooperation. Further, hardware such as a circuit for executing part of the program may be arranged, and the processing described in the embodiment may be executed by cooperation between the hardware and the computer which executes the software.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-094642, filed Apr. 26, 2013, which is hereby incorporated by reference herein in its entirety.

What is claimed is:

1. A communicating apparatus having an image forming unit, comprising:
    a reception unit configured to receive a request command which requires a response, wherein a partner apparatus transmits the request command;
    a determination unit configured to determine based on the request command received by the reception unit, whether a communication mode of the partner apparatus matches a communication mode executed by the communicating apparatus; and a response control unit configured to respond to the request command received from the partner apparatus, in a case where the determination unit determines that the communication mode of the partner apparatus matches the communication mode executed by the communicating apparatus, wherein, in a case where the determination unit determines that the communication mode of the partner apparatus does not match the communication mode executed by the communicating apparatus, the response control unit does not respond to the request command received from the partner apparatus, and wherein the communication mode of the communicating apparatus needs a negotiation process for determining an apparatus serving as an access point between the communicating apparatus and the partner apparatus.

2. The apparatus according to claim 1, wherein the determination unit refers to presence/absence of a predetermined attribute added to the request command, and determines whether the communication mode of the partner apparatus matches the communication mode executed by the communicating apparatus.

3. The apparatus according to claim 1, wherein the request command is a command for searching for an apparatus to be wirelessly connected to the communicating apparatus.

4. The apparatus according to claim 1, wherein the communication mode is a Wi-Fi Direct mode or a Wi-Fi Direct extended mode which is different from the Wi-Fi Direct mode.

5. The apparatus according to claim 1, wherein the response control unit ignores the request command received from the partner apparatus, in a case where the determination unit determines that the communication mode of the partner apparatus does not match the communication mode executed by the communicating apparatus.

6. The apparatus according to claim 1, wherein the image forming unit has a printing function to execute printing process.

7. A communicating method which is executed in a communicating apparatus having an image forming unit, comprising:

receiving a request command which requires a response, wherein a partner apparatus transmits the request command;

determining based on the request command received from the partner apparatus, whether a communication mode of the partner apparatus matches a communication mode executed by the communicating apparatus; and responding to the request command received from the partner apparatus, in a case where it is determined that the communication mode of the partner apparatus matches the communication mode executed by the communicating apparatus, wherein, in a case where it is determined that the communication mode of the partner apparatus does not match the communication mode executed by the communicating apparatus, responding to the request command received from the partner apparatus is not performed, and wherein the communication mode of the communicating apparatus needs a negotiation process for determining an apparatus serving as an access point between the communicating apparatus and the partner apparatus.

8. The method according to claim 7, wherein the presence/absence of a predetermined attribute added to the request command is referred, and it is determined based on the presence/absence, whether the communication mode of the partner apparatus matches the communication mode executed by the communicating apparatus.

9. The method according to claim 7, wherein the request command is a command for searching for an apparatus to be wirelessly connected to the communicating apparatus.

10. The method according to claim 7, wherein the communication mode is a Wi-Fi Direct mode or a Wi-Fi Direct extended mode which is different from the Wi-Fi Direct mode.

11. The method according to claim 7, further comprising ignoring the request command received from the partner apparatus, in a case where it is determined that the communication mode of the partner apparatus does not match the communication mode executed by the communicating apparatus.

12. The method according to claim 7, wherein the image forming unit has a printing function to execute printing process.

13. A non-transitory computer-readable storage medium storing a program for causing a computer serving as a communicating apparatus having an image forming unit to execute:

receiving a request command which requires a response, wherein a partner apparatus transmits the request command;

determining based on the request command received from the partner apparatus, whether a communication mode of the partner apparatus matches a communication mode executed by the communicating apparatus; and responding to the request command received from the partner apparatus, in a case where it is determined that the communication mode of the partner apparatus matches the communication mode executed by the communicating apparatus, wherein, in a case where it is determined that the communication mode of the partner apparatus does not match the communication mode executed by the communicating apparatus, responding to the request command received from the partner apparatus is not performed, and wherein the communication mode of the communicating apparatus needs a negotiation process for determining an apparatus serving as an access point between the communicating apparatus and the partner apparatus.

14. The medium according to claim 13, wherein the presence/absence of a predetermined attribute added to the request command is referred, and it is determined based on the presence/absence, whether the communication mode of the partner apparatus matches the communication mode executed by the communicating apparatus.

15. The medium according to claim 13, wherein the request command is a command for searching for an apparatus to be wirelessly connected to the communicating apparatus.

16. The medium according to claim 13, wherein the communication mode is a Wi-Fi Direct mode or a Wi-Fi Direct extended mode which is different from the Wi-Fi Direct mode.

17. The medium according to claim 13, further comprising ignoring the request command received from the partner apparatus, in a case where it is determined that the communication mode of the partner apparatus does not match the communication mode executed by the communicating apparatus.

18. The medium according to claim 13, wherein the image forming unit has a printing function to execute printing process.

\* \* \* \* \*